United States Patent Office 3,419,550
Patented Dec. 31, 1968

3,419,550
PENTACYCLIC STEROID INTERMEDIATES AND
METHOD OF PREPARING THE SAME
Alberto Ercoli, Milan, and Rinaldo Gardi, Carate
Brianza, Milan, Italy, assignors, by mesne assignments, to Warner-Lambert Pharmaceutical
Company, Morris Plains, N.J., a corporation of
Delaware
No Drawing. Filed Aug. 19, 1966, Ser. No. 573,490
Claims priority, application Italy, Aug. 23, 1965,
18,856/65
18 Claims. (Cl. 260—239.55)

The present invention is concerned with new steroid derivatives and more particularly relates to a method of preparing pentacyclic steroids having an aromatic ring condensed between the 4 and 6 positions of the cyclopentanopolyhydrophenanthrene nucleus.

This invention also relates to novel steroid intermediates and to certain novel and useful pentacyclic steroids produced thereby.

The method of this invention provides new benzo[d,e] steroids of the androstane and pregnane series characterized by the following structural formula:

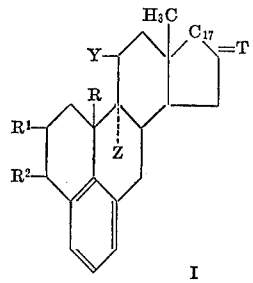

I in which R is hydrogen or methyl, $R^1$ is hydrogen, fluorine or methyl, $R^2$ is a keto group, a β-hydroxy group or a lower acyloxy group up to 9 carbon atoms, inclusive, Y is hydrogen, a β-hydroxy group or a keto group, Z is hydrogen or a halogen atom, particularly fluorine or chlorine, T is $H_2$, $(\alpha H,\beta CH_3)$, $(\alpha CH_3,\beta H)$, $(\alpha H,\beta F)$, $(\alpha F,\beta H)$, $(\alpha H,\beta Cl)$, $(\alpha Cl,\beta H)$ or $=CH_2$, the $C_{17}$ carbon atom has the following structure:

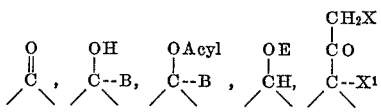

where X and $X^1$ can each represent hydrogen, hydroxyl or a lower acyloxy group (OAcyl) up to 9 carbon atoms; E represents one of the following groupings:

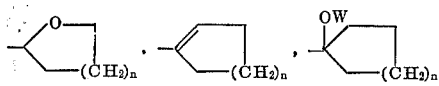

(in which n is one of the integers 1 and 2 and W is methyl or ethyl), and B is hydrogen or a saturated or unsaturated lower hydrocarbon radical of from 1 to 3 carbon atoms, inclusive, such as methyl, ethyl, propyl, ethynyl, allyl, propynyl, with T being $H_2$ when B is other than hydrogen.

The term "lower acyloxy group up to 9 carbon atoms" as used herein, comprises acyloxy groups derived from alkanoic acids such as acetic, propionic, butyric, valeric, caproic, oenantic, caprilic and pelargonic acids; acyloxy groups derived from phenylalkanoic acids, such as phenylacetic or phenylpropionic acid; acyloxy groups derived from cycloalkylalcanoic acids, such as cyclopentylpropionic acid and acyloxy groups derived from bicarboxylic acids, such as succinic acid. Preferred lower acyloxy group is the acetoxy group.

The new pentacyclic steroids of the present invention possess a pronounced antigonadotrophic activity and are useful in inducing a decrease of hypophysis hormonal secretion. In addition they show an anti-ovulatory activity and a satisfactory anabolic effect without androgenic side-effects.

Some interesting compounds within the scope of this invention are 3,17-dihydroxy benz[d,e]androstane derivatives of the formula:

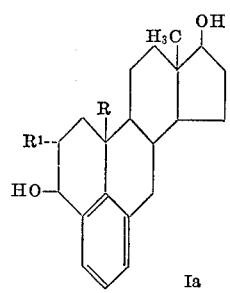

Ia where R and $R^1$ are as defined above, and their corresponding 3 and/or 17β-lower acyl esters up to 9 carbon atoms, and 3-keto benz[d,e]androstan-17-ethers of the formula:

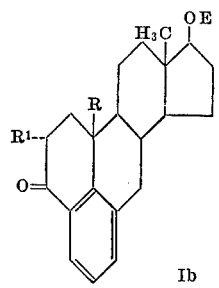

Ib where R, $R^1$ and E are as defined above.

The novel steroid intermediates which are used in the method of this invention for the preparation of pentacyclic steroids, are 4-allylidene-$\Delta^5$-3-keto steroids and 4-allenyl-$\Delta^5$-3-keto steroids represented by the Formulas II and III, respectively

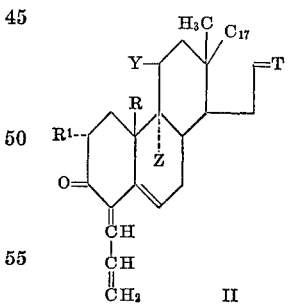  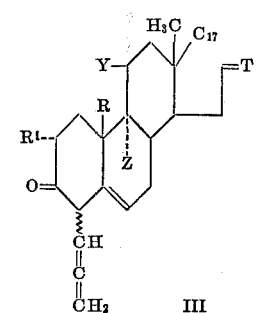

II                          III wherein R, $R^1$, T, Y, Z are defined above, while the $C_{17}$ carbon atom has the following structure:

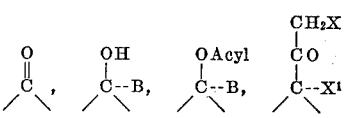

in which X, $X^1$, OAcyl and B are as defined above. The 4-allenyl compounds may have either the α- or the β-configuration.

The process of this invention comprises the step of catalytically cyclodehydrogenating, in an anhydrous organic solvent and in the presence of palladium or platinum as catalyst, a 4-allylidene-$\Delta^5$-3-keto steroid or a 4-allenyl- $\Delta^5$-3-keto steroid or a mixture of said corresponding derivatives.

The cyclodehydrogenation step is accomplished by heating the compounds of Formula II and/or III at a temperature of about 50–180° C. and preferably between 100–155° C. for a period of from about 2 to about 12 hours. The medium of the reaction can be selected from anhydrous organic polar and non-polar solvents and may be an alcohol, such as ethanol, propanol, isopropanol, n-butanol or pentanol; a heterocyclic base, such as pyridine, picolines, lutidines, collidines, quinoline, isoquinoline, pyrimidine, pirazine; a dialkylated amide, such as dimethylformamide or dimethylacetamide, a dialkylated aromatic amine, such as dimethylaniline, diethylaniline or dimethyl-o-toluidine, a dialkylsulfoxide, such as dimethylsulfoxide, or a nitrile, such as benzonitrile, phenylacetonitrile and the like. Preferred solvents for the reaction are pyridine, dimethylformamide and dimethylsulfoxide.

The catalysts of the reaction, palladium or platinum, are generally employed with a charcoal or asbestos carrier containing 2–30 percent of the metal. Preferred catalyst is palladium-charcoal.

The cyclodehydrogenation step provides 3-keto benzo[d,e]steroids of the following formula:

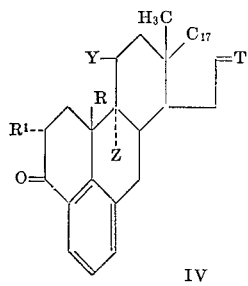

IV in which R, $R^1$, T, Y, Z and the $C_{17}$ carbon atom are as defined in the Formulae II and III above.

The 3-keto benzo[d, e]steroids are isolated from the reaction mixture according to known procedures, e.g. by evaporating the solvent and crystallizing the residue or by diluting the reaction mixture with water and separating the precipitate by filtration.

For the preperation of the benzo[d, e]steroids of Formula I above in which the substituent at the 3-position is other than keto, the 3-keto benzo[d, e]steroids of Formula IV, particularly those having a secondary hydroxyl group at $C_{17}$, are further submitted to normal reduction methods, for instance to a treatment with sodium borohydride, lithium aluminum hydride or t. butoxy aluminum hydride in order to convert the 3-keto group to a 3-hydroxy group. If desired, the 3-hydroxy group can be successively esterified according to known methods, to yield a compound of Formula I in which $R^2$ is a hydroxy or acyloxy group.

Furthermore the secondary hydroxy group at the 17-position can be converted into the ethers of special type defined by the Formula I above, i.e. 17-tetrahydrofuryl, 17-tetrahydropyranyl, 17-(1'-cyclopentenyl), 17-(1'-cyclohexenyl), 17-(1'-lower alkoxy) cyclopentyl and 17-(1'-lower alkoxy)cyclohexyl ethers of 17β-hydroxy benz[d, e]androstanes. These ethers can be readily prepared according to known methods. Tetrahydrofuryl or tetrahydropyranyl ethers are made by reactions of the 17β-hydroxy 3-keto benzo[d, e]steroid with dihydrofurane or dihydropyrane under acid catalysis. The cyclopentenyl or cyclohexenyl ethers are obtained by reacting at a temperature higher than 80° C. a 17β-hydroxy 3-keto benzo [d, e]steroid with a functional derivative of cyclopentanone or cyclohexanone, said derivative being a methyl or ethyl enolether, a dimethyl or diethyl acetal or a mixture of these derivatives. Similarly, the 17-(1'-lower alkoxy) cyclopentyl or cyclohexyl ethers are made by treatment of 17β-hydroxy-3-keto benzo[d, e]steroid with methyl or ethyl enolether, dimethyl or diethyl acetal of cyclopentanone or cyclohexanone under mild conditions, that is by operating at room temperature, in the presence of an organic solvent and an acid catalyst.

The intermediates 4-allylidene and 4-allenyl compounds corresponding to the Formulae II and III above represent a new class of steroid derivatives and form a part of this invention. They can be prepared according to a particular feature of this invention from 3-propargyl enolethers of $\Delta^4$-3-keto steroids of the general formula:

$$\text{CH} \equiv \text{C}-\text{CH}_2-\text{O}-$$

V (in which R, $R^1$, T, Y, Z and the $C_{17}$ carbon atom are as defined in the Formula IV), under the conditions of a Claisen-rearrangement. By heating a 3-propargyl enolether of Formula V in a hydrocarbon diluent having boiling point higher than 100° C., such as toluene or xylene, there is obtained a 4-allylidene-$\Delta^5$-3-keto steroid in admixture with the corresponding 4-allenyl-$\Delta^5$-3-keto steroid.

The mixture of the two compounds can be directly employed for the cyclodehydrogenation step according to the invention or can be previously separated in its components by fractional crystallization. In practice we prefer to carry out the further step on the mixture itself of the 4-allylidene and 4-allenyl compounds, without further purification.

The respective amount of 4-allylidene and 4-allenyl-$\Delta^5$-3-keto steroid obtained by the Claisen rearrangement depends upon the character and nature of the starting steroid as well as upon the working conditions. In general the 4-allenyl compounds are obtained in minor amounts in comparison to the corresponding 4-allylidene derivatives, but in some instances the 4-allenyl compound can be practically the sole product of the Claisen-rearrangement, as in the case of the propargyl enolether of $\Delta^4$-androsten-3,17-dione which produces only 4-allenyl-$\Delta^5$-androsten-3,17-dione. However, the 4-allenyl compounds can be easily converted, if desired, into their corresponding 4-allylidene derivatives by simple chromatography on alumina of their solution in an organic solvent.

The propargyl enolethers of Formula V employed as starting materials can be prepared from the corresponding lower alkyl enolethers, i.e. methyl or ethyl enolether of $\Delta^4$-3-ketosteroid, through an exchange reaction with propargyl alcohol, according to the procedure described in the U.S. Patent Ser. No. 3,019,241.

The following examples are illustrative of this invention, but they are not to be construed as limiting.

EXAMPLE 1

10 g. of 3-ethyl enolether of testosterone acetate obtained by treatment of testosterone acetate with ethyl orthoformate, are dissolved in 800 cc. of anhydrous dioxane and treated with 200 mg. of p. toluenesulphonic acid and 15 cc. of propargyl alcohol. The reaction mixture is heated up to boiling and distilled until small volume. To the residual solution some drops of pyridine are added, then the mixture is concentrated under vacuum. The residue is taken up with ether, the solution is filtered and the solvent evaporated to obtain 3-propargyloxy-17β-acetoxy-$\Delta^{3,5}$-androstadiene (3-propargyl enolether of testosterone acetate), M.P. 149–151° C.; $[\alpha]_D^{22} = -148°$ (dioxane, c.=0.5%).

EXAMPLE 2

(A) A solution of 2 g. of 3-propargyl enolether of testosterone acetate in 50 cc. of toluene is heated under reflux for about 8 hours. After evaporation of the solvent the residue is submitted to fractional crystallization, thus separating 4-allenyl-Δ⁵-androsten-17β-ol-3-one 17-acetate; M.P. 135–137° C.; $[\alpha]_D^{22} = +3°$ (dioxane, c.=0.5%) and 4-allyliden-Δ⁵-androsten-17β-ol-3-one 17-acetate; M.P. 130–133° C.; $[\alpha]_D^{22} = -84°$ (dioxane, c.=0.5%).

(B) A solution of 2 g. of 4-allyliden-17β-acetoxy-Δ⁵-androsten-3-one in 30 cc. of pyridine is heated under reflux for 4 hours in the presence of 200 mg. of 5% palladium charcoal. The catalyst is then filtered, the solvent evaporated under vacuum and the residue crystallized from methanol yielding 17β-acetoxy-benz[d,e]androstan-3-one, M.P. 143–145° C.; $[\alpha]_D^{22} = -14.5°$ (dioxane, c.=0.5%). The same compound is obtained by applying the above procedure to 4-allenyl-Δ⁵-androsten-17β-ol-3-one 17-acetate.

EXAMPLE 3

2 g. of 3-propargyl enolether of testosterone propionate (obtained following the procedure described in Example 1) is dissolved in 50 cc. of toluene and the solution heated under reflux for about 8 hours. After evaporation of the solvent, the crude residue consisting of 4-allylidene-17β-propionoxy-Δ⁵-androsten-3-one in admixture with a minor amount of 4-allenyl-17β-propionoxy-Δ⁵-androsten-3-one, is dissolved in benzene and the solution passed through a column of activated alumina. By eluting with benzene, evaporating the solvent and crystallizing the residue, pure 4-allylidene-17β-propionoxy-Δ⁵-androsten-3-one is obtained.

This compound, heated in dimethylformamide solution in the presence of 5% palladium charcoal following the procedure described in Example 2(B), gives 17β-propionoxy-benz[d,e]androstan-3-one, M.P. 129–131° C.; $[\alpha]_D^{22} = -13°$ (dioxane, c.=0.5%).

EXAMPLE 4

3-propargyl enolether of Δ⁴-androstene-3,17-dione is processed in boiling toluene as described in Example 3 to give 4-allenyl-Δ⁵-androstene-3,17-dione. This compound is converted with the procedure of Example 2(B) to benz[d,e]androstane-3,17-dione.

EXAMPLE 5

By operating according to the procedure of Example 2(A), the following 4-allyliden-Δ⁵-androstenes are obtained in admixture with their corresponding 4-allenyl compounds:

4-allylidene-17β-butyroxy-Δ⁵-androsten-3-one
4-allylidene-17β-valeroxy-Δ⁵-androsten-3-one
4-allylidene-17β-caproyloxy-Δ⁵-androsten-3-one
4-allylidene-17β-oenanthoxy-Δ⁵-androsten-3-one
4-allylidene-17β-phenylpropionoxy-Δ⁵-androsten-3-one
4-allylidene-17β-cyclopentylpropionoxy-Δ⁵-androsten-3-one
4-allylidene-17α-methyl-Δ⁵-androsten-17β-ol-3-one
4-allylidene-17α-methyl-17β-acetoxy-Δ⁵-androsten-3-one
4-allylidene-17α-ethyl-Δ⁵-androsten-17β-ol-3-one
4-allylidene-17α-propyl-Δ⁵-androsten-17β-ol-3-one
4-allyliden-17α-allyl-Δ⁵-androsten-17β-ol-3-one
4-allylidene-17α-propynyl-Δ⁵-androsten-17β-ol-3-one
4-allylidene-9α-fluoro-17α-methyl-Δ⁵-androstene-11β,17β-diol-3-one
4-allylidene-2α-methyl-17β-acetoxy-Δ⁵-androsten-4-one
4-allylidene-2α,17α-dimethyl-Δ⁵-androsten-17β-ol-3-one
4-allylidene-16-methylene-Δ⁵-androsten-17β-ol-3-one
4-allylidene-16β-chloro-Δ⁵-androsten-17β-ol-3-one
4-allylidene-2α-fluoro-17β-acetoxy-Δ⁵-androsten-3-one.

The mixture of 4-allylidene and 4-allenyl compound, worked according to the procedure of Example 2(B), is converted into the corresponding benz[d,e]androstane derivative, thus obtaining:

17β-butyroxy-benz[d,e]androstan-3-one
17β-valeroxy-benz[d,e]androstan-3-one
17β-caproyloxy-benz[d,e]androstan-3-one
17β-oenanthoxy-benz[d,e]androstan-3-one
17β-phenylpropionoxy-benz[d,e]androstan-3-one
17β-cyclopentylpropionoxy-benz[d,e]androstan-3-one
17α-methyl-benz[d,e]androstan-17β-ol-3-one
17α-methyl-17β-acetoxy-benz[d,e]androstan-3-one
17α-ethyl-benz[d,e]androstan-17β-ol-3-one
17α-propyl-benz[d,e]androstan-17β-ol-3-one
17α-allyl-benz[d,e]androstan-17β-ol-3-one
17α-propynyl-benz[d,e]androstan-17β-ol-3-one
9α-fluoro-17α-methyl-benz[d,e]androstane-11β,17β-diol-3-one
2α-methyl-17β-acetoxy-benz[d,e]androstan-3-one
2α,17α-dimethyl-benz[d,e]androstan-17β-ol-3-one
16-methylene-benz[d,e]androstan-17β-ol-3-one
16β-chloro-benz[d,e]androstan-17β-ol-3-one
2α-fluoro-17β-acetoxy-benz[d,e]androstan-3-one.

EXAMPLE 6

5 g. of 3-propargyloxy-17β-acetoxy-19-nor-Δ³,⁵-androstadiene are dissolved in 50 cc. of toluene and the solution is refluxed for 6 hours. After evaporation of the solvent, the crude residue consisting of a mixture of 4-allenyl-17β-acetoxy-19-nor-Δ⁵-androsten-3-one and 4-allyliden-17β-acetoxy-19-nor-Δ⁵-androsten-3-one is dissolved in benzene and the solution is chromatographed on alumina. This treatment provides pure 4-allyliden-17β-acetoxy-19-nor-Δ⁵-androsten-3-one.

A solution of 2 g. of this compound in 30 cc. of dimethylsulfoxide is heated at reflux for 4 hours in the presence of 200 mg. of 10% palladium charcoal. After filtration of the catalyst, the solvent is evaporated under vacuum and the residue crystallized from methanol to give 17β-acetoxy-19-nor-benz[d,e]androstan-3-one, M.P. 182–185° C.; $[\alpha]_D^{22} = -56.5°$ (dioxane, c.=0.5%).

EXAMPLE 7

By applying the procedure of Example 6 to propargyl enolethers of Δ⁴-3-keto 17α-substituted 19-norsteroids, there are prepared the corresponding 4-allylidene-Δ⁵-derivatives, including the following ones: 4-allyliden-17α-ethynyl-17β-acetoxy-19-nor-Δ⁵-androsten-3-one; 4-allyliden-17α-ethynyl-19-nor-Δ⁵-androsten-17β-ol-3-one; 4-allylidene-19-nor-Δ⁵-androsten-17β-ol-3-one, 4-allylidene-17β-propionoxy-19-nor-Δ⁵-androsten-3-one; 4-allylidene-17α-methyl-19-nor-Δ⁵-androsten-17β-ol-3-one. The 4-allylidene compounds mentioned above are converted following the procedures of Examples 2(B) and 6 to the corresponding 19-nor-benz[d,e]androstanes, thus obtaining: 17α-ethynyl-17β-acetoxy-19-nor-benz[d,e]androstan-3-one; 17α-ethynyl-19-nor-benz[d,e]androstan-17β-ol-3-one; 19-nor-benz[d,e]androstan-17β-ol-3-one; 17β-propionoxy-19-nor-benz[d,e]androstan-3-one; 17α-methyl-19-nor-benz[d,e]androstan-17β-ol-2-one.

EXAMPLE 8

A solution of 2 g. of 4-allyliden-17β-acetoxy-Δ⁵-androsten-3-one in 50 cc. of chlorobenzene is heated at reflux for 6 hours in the presence of 200 mg. of 5% Pd/C. The mixture is worked as in Example 1(B) to give 17β-acetoxy-benz[d,e]androstan-3-one. The same result is obtained by employing o. dichlorobenzene or p. dichlorobenzene as reaction medium.

EXAMPLE 9

A solution of 1 g. of 4-allenyl-Δ⁵-androstene-3,17-dione in 50 cc. of benzonitrile is heated at 138° C. for 4 hours in the presence of 100 mg. of 5α Pd/C to give benz[d,e]androstane-3,17-dione, M.P. 188–190° C.; $[\alpha]_D^{22} = +79°$ (dioxane, c.=0.5%).

EXAMPLE 10

3-propargyl enolether of progesterone is prepared by treatment of 3-ethyl enolether of progesterone with propargyl alcohol following the procedure of Example 1.

This compound is heated in toluene solution for about 6 hours and converted into a mixture of 4-allylidene and 4-allenyl-Δ⁵-pregnene-3,20-dione. The components of the mixture are separated by fractional crystallization from methanol. 4-allylidene-Δ⁵-pregnene-3,20-dione is obtained; M.P. 178–181° C.; $[\alpha]_D^{22}=-26.5°$ (dioxane) while 4-allenyl-Δ⁵-pregnene-3,20-dione melts at 165–172° C.

In the same manner, other representative 4-allylidene and 4-allenyl-Δ⁵-pregnene derivatives are prepared, including the following ones:

4-allyliden-17α-acetoxy-Δ⁵-pregnene-3,20-dione
4-allylidene-17α-valeroxy-Δ⁵-pregnene-3,20-dione
4-allenyl-17α-acetoxy-Δ⁵-pregnene-3,20-dione
4-allylidene-Δ⁵-pregnene-21-ol-3,20-dione
4-allyliden-21-acetoxyΔ⁵-pregnene-3,20-dione
4-allenyl-21-acetoxy-Δ⁵-pregnene-3,20-dione
4-allylidene-Δ⁵-pregnene-17α,21-diol-3,20-dione
4-allylidene-Δ⁵-pregnene-17α,21-diol-3,20-dione 17-acetate
4-allylidene-Δ⁵-pregnene-17α,21-diol-3,20-dione 17-valerate
4-allylidene-Δ⁵-pregnene-17α,21-diol-3,20-dione 17-butyrate
4-allenyl-Δ⁵-pregnene-17α,21-diol-3,20-dione 17-propionate
4-allylidene-Δ⁵-pregnene-17α,21-diol-3,11,20-trione
4-allylidene-Δ⁵-pregnene-11β,17α,21-triol-3,20-dione and 21-acetate thereof
4-allenyl-Δ⁵-pregnene-11β,17α,21-triol-3,20-dione
4-allylidene-9α-fluoro-16α-methyl-Δ⁵-pregnene-11β,17α,21-triol-3,20-dione
4-allylidene-9α-fluoro-16β-methyl-Δ⁵-pregnene-11β,17α,21-triol-3,20-dione
4-allenyl-9α-fluoro-16β-methyl-Δ⁵-pregnene-11β,17α,21-triol-3,20-dione
4-allylidene-16-methylene-Δ⁵-pregnene-11β,17α,21-triol-3,20-dione
4-allylidene-9α-fluoro-16-methylene-Δ⁵-pregnene-11β,17α,21-triol-3,20-dione
4-allenyl-9α-fluoro-16-methylene-Δ⁵-pregnene-11β,17α,21-triol-3,20-dione
4-allylidene-2α-methyl-Δ⁵-pregnene-11β,17α,21-triol-3,20-dione.

It will be obvious to those skilled in the art that in the above mentioned 21-hydroxy pregnenes the 21-hydroxyl may be present in an esterified form with conventional acyl groups, e.g. acetates, propionates, butyrates, oenanthates, cyclopentyl propionates, phenylpropionates and the like.

The 4-allylidene and/or 4-allenyl-Δ⁵-pregnene derivatives can be converted according to the procedure illustrated in the foregoing examples to the corresponding benzo[d,e]pregnane compounds.

EXAMPLE 11

A solution of 600 mg. of 17β-acetoxy-benzo[d,e]androstan-3-one in 15 cc. of tetrahydrofurane is treated with 120 mg. of sodium borohydride and the resulting mixture is left to stand overnight at room temperature. The mixture is then concentrated under vacuum and the residue diluted with water. The precipitate obtained, filtered and recrystallized from acetone, gives 550 mg. of 17β-acetoxy-benz[d,e]androstan-3β-ol, M.P. 160–162° C.;

$$[\alpha]_D^{22}=-12°$$

(dioxane, c=0.5%).

In the same manner, other representative 3β-hydroxy benz[d,e]androstanes are obtained, including the following ones:

17β-propionoxy benz[d,e]androstan-3β-ol
17β-oenanthoxy benz[d,e]androstan-3β-ol
2α-methyl-17β-acetoxy benz[d,e]androstan-3β-ol and
17β-acetoxy-19-nor benz[d,e]androstan-3β-ol.

EXAMPLE 12

A solution of 2.5 g. of 17β-acetoxy benz[d,e]androstan-3-one in 35 c. of tetrahydrofurane and 65 cc. of diethyl ether is added under stirring to a solution of 1.25 g. of lithium aluminium hydride in 30 cc. of diethyl ether. The mixture is heated on water bath and then diluted cautiously with water. The mixture is then extracted with ether and the etheral extracts evaporated off. The oily residue is taken up with 15 cc. of pyridine and 7.5 cc. of acetic anhydride and left to stand a night at room temperature.

The mixture is maintained cooled with ice and the precipitate which separates is filtered and recrystallized from methylene chloride-methanol to give 2.22 g. of 3,17-diacetoxy-benz[d,e]androstane, M.P. 159–160.5° C.; $[\alpha]_D^{22}=-47°$ (dioxane, c.=0.5%).

EXAMPLE 13

500 mg. of 17β-acetoxy-benz[d,e]androstan-3-one are dissolved in 10 cc. of methanol and 10 cc. of tetrahydrofurane and hydrogenated at room temperature and pressure in the presence of 200 mg. of 5% palladium on charcoal. After absorption of 3 mole of hydrogen, the catalyst is removed by filtration and the solution evaporated under vacuum to dryness. The crystalline residue, taken up with methanol, gives 300 mg. of 17β-acetoxy benz[d,e]androstane; M.P. 102–104° C.

EXAMPLE 14

A mixture of 1 g. of benzo[d,e]androstan-17β-ol-3-one, 3 cc. of cyclopentanone dimethylacetal, 5 cc. of dimethylformamide and 10 mg. of p-toluenesulphonic acid is heated at 180° C. for about an hour, then it is neutralized with a few drops of pyridine and evaporated under vacuum. The residue, crystallized from methanol, gives the 17-(1'-cyclopentenyloxy)benz[d,e]androstan-3-one, M.P. 152–154° C.; $[\alpha]_D^{22}=+15°$ (dioxane, c.=0.5%).

By substituting in the above reaction cyclohexanone dimethylacetal for cyclopentanone dimethylacetal there is obtained the corresponding 17-(1'-cyclohexenyloxy)benz[d,e]androstan-3-one. In the same manner are prepared cyclopentenyl and cyclohexenyl ethers of 2α-methyl benz[d,e]androstan-17β-ol-3-one, 2α-fluoro benz[d,e]androstan-17β-ol-3-one and 19-nor analogs thereof.

EXAMPLE 15

To a solution of 1 g. of benz[d,e]androstan-17β-ol-3-one in 10 cc. of tert. butyl alcohol there are added 10 mg. of pyridine tosylate and 1 cc. of cyclohexanone methyl enolether. After a night of rest at room temperature there is obtained a precipitate formed by the 17β-(1'-methoxy)-cyclohexyloxy-benz[d,e]androstan-3-one.

EXAMPLE 16

To an anhydrous solution of 1 g. of benz[d,e]androstan-17β-ol-3-one in 100 cc. of benzene there is added 2 cc. of dihydropyran and 100 mg. of p-toluenesulphonic acid. After a night at room temperature the solution is neutralised and the solvent is evaporated under vacuum. The residue, crystallized from methanol, gives the 17β-(2'-tetrahydropyranyloxy)benz[d,e]androstan-3-one.

By employing an equivalent quantity of dihydrofuran in lieu of dihydropyran, there is obtained the corresponding 17-tetrahydrofuryl ether of benz[d,e]androstan-17β-ol-3-one. In the same manner are prepared tetrahydropyranyl ethers of 2α-methyl benz[d,e]androstan-17β-ol-3-one, 2α-fluoro benz[d,e]androstan-17β-ol-3-one and 19-nor analogs thereof.

We claim:
1. A method for the preparation of benzo[d,e]steroids of the androstane and pregnane series which comprises the step of catalytically cyclodehydrogenating by heating a member selected from the group consisting of

(a) a 4-allylidene-Δ⁵-3-keto steroid of the formula:

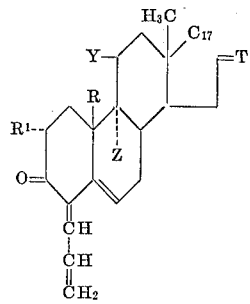

wherein R is selected from the group consisting of hydrogen and methyl; R¹ is selected from the group consisting of hydrogen fluorine and methyl; Y is selected from the group consisting of hydrogen, a β-hydroxy group and a keto group; Z is selected from the group consisting of hydrogen, fluorine and chloride; T is selected from the group consisting of H₂, (αH, βCH₃), (αCH₃, βH), (αH, βF), (αF, βH), (αH, βCl), (αCl, βH) and =CH₂; the C₁₇ carbon atom has the structure selected from the group consisting of the following groupings:

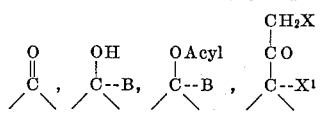

where X and X₁ are each selected from the group consisting of hydrogen, hydroxyl and a lower acyloxy group (OAcyl) up to 9 carbon atoms, inclusive; and B is selected from the group consisting of hydrogen and a lower hydrocarbon radical of from 1 to 3 carbon atoms, inclusive, with T being H₂ when B is other than hydrogen.

(b) a 4-allenyl-Δ⁵-3-ketosteroid of the formula:

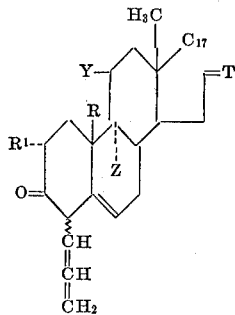

where R, R¹, Y, Z, T and the C₁₇ carbon atom are as defined above and (c) a mixture of said corresponding 4-allylidene and 4-allenyl-Δ⁵-3-keto steroids, in an anhydrous organic solvent and in the presence of a catalyst selected from the group consisting of palladium and platinum.

2. A method for the preparation of benzo[d,e]steroids of the androstane and pregnane series which comprises the step of catalytically cyclodehydrogenating by heating a 4-allylidene-Δ⁵-3-keto steroid of the formula:

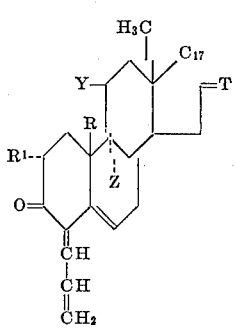

wherein R is selected from the group consisting of hydrogen and methyl; R¹ is selected from the group consist-
ing of hydrogen fluorine and methyl; Y is selected from the group consisting of hydrogen, a β-hydroxy group and a keto group; Z is selected from the group consisting of hydrogen, fluorine and chlorine; T is selected from the group consisting of H₂, (αH, βCH₃), (αCH₃, βH), (αH, βF), (αF, βH), (αH, βCl), (αCl, βH) and =CH₂; the C₁₇ carbon atom has the structure selected from the group consisting of the following groupings:

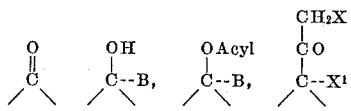

where X and X₁ are each selected from the group consisting of hydrogen, hydroxyl and a lower acyloxy group (OAcyl) up to 9 carbon atoms, inclusive; and B is selected from the group consisting of hydrogen and a lower hydrocarbon radical of from 1 to 3 carbon atoms, inclusive, with T being H₂ when B is other than hydrogen, in admixtures with the corresponding 4-allenyl-Δ⁵-3-keto compound, in an anhydrous organic solvent and in the presence of a catalyst selected from the group consisting of palladium and platinum.

3. A method for the preparation of benzo[d,e]steroids of the androstane and pregnane series which comprises the step of catalytically cyclodehydrogenating by heating a 4-allylidene-Δ⁵-3-keto steroid of the formula:

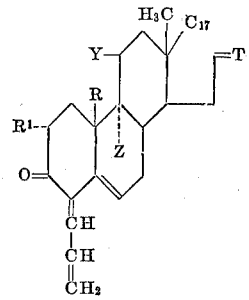

wherein R is selected from the group consisting of hydrogen and methyl; R¹ is selected from the group consisting of hydrogen, fluorine and methyl; Y is selected from the group consisting of hydrogen, a β-hydroxy group and a keto group; Z is selected from the group consisting of hydrogen, fluorine and chlorine; T is selected from the group consisting of H₂, (αH, βCH₃), (αCH₃, βH), (αH, βF), (αF, βH), (αH, βCl), (αCl, βH) and =CH₂; the C₁₇ carbon atom has the structure selected from the group consisting of the following groupings:

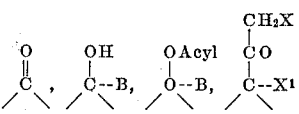

where X and X₁ are each selected from the group consisting of hydrogen, hydroxyl and a lower acyloxy group (OAcyl) up to 9 carbon atoms, inclusive; and B is selected from the group consisting of hydrogen and a lower hydrocarbon radical of from 1 to 3 carbon atoms, inclusive, with T being H₂ when B is other than hydrogen, in an anhydrous organic solvent and in the presence of a catalyst selected from the group consisting of palladium and platinum.

4. A method as defined in claim 1 in which the organic solvent is selected from the group consisting of pyridine, dimethylformamide and dimethylsulfoxide.

5. A steroid compound selected from the group consisting of those having the formulae:

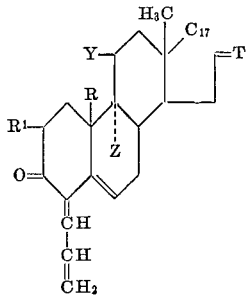 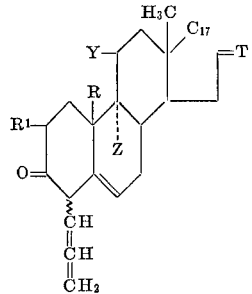

wherein R is selected from the group consisting of hydrogen and methyl; $R^1$ is selected from the group consisting of hydrogen, fluorine and methyl; Y is selected from the group consisting of hydrogen, a β-hydroxy group and a keto group; Z is selected from the group consisting of hydrogen, fluorine and chlorine; T is selected from the group consisting of $H_2$, (αH, βCH$_3$), (αCH$_3$, βH), (αH, βF), (αF, βH), (αH, βCl), (αCl, βH) and =CH$_2$; the $C_{17}$ carbon atom has the structure selected from the group consisting of the following groupings:

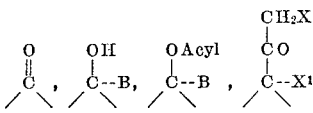

in which X and $X_1$ are each selected from the group consisting of hydrogen, hydroxyl and a lower acyloxy group (OAcyl) up to 9 carbon atoms, inclusive; B is selected from the group consisting of hydrogen and a lower hydrocarbon radical of from 1 to 3 carbon atoms, inclusive, with T being $H_2$ when B is other than hydrogen.

6. A 4-allylidene-Δ$^5$-3-ketosteroid of the formula:

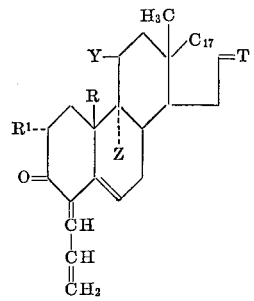

wherein R is selected from the group consisting of hydrogen and methyl; $R_1$ is selected from the group consisting of hydrogen, fluorine and methyl; Y is selected from the group consisting of hydrogen, a β-hydroxy group and a keto group; Z is selected from the group consisting of hydrogen, fluorine and chloride; T is selected from the group consisting of $H_2$, (αH, βCH$_3$), (αCH$_3$, βH), (αH, βF), (αF, βH), (αH, βCl), (αCl, βH) and =CH$_2$; the $C_{17}$ carbon atom has the structure selected from the group consisting of the following groupings:

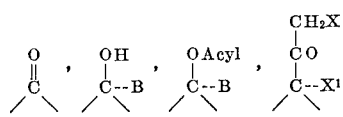

where X and $X_1$ are each selected from the group consisting of hydrogen, hydroxyl and a lower acyloxy group (OAcyl) up to 9 carbon atoms, inclusive; and B is selected from the group consisting of hydrogen and a lower hydrocarbon radical of from 1 to 3 carbon atoms, inclusive, with T being $H_2$ when B is other than hydrogen.

7. 4-allyliden-Δ$^5$-androstene-3,17-dione.
8. 4-allyliden-17β-acetoxy-Δ$^5$-androsten-3-one.
9. 4-allylidene-17α-methyl-17β-acetoxy-Δ$^5$-androsten-3-one.
10. 4-allylidene-Δ$^5$-pregnene-3,20-dione.
11. 4-allylidene-Δ$^5$-pregnene-11β,17α,21-triol-3,20-dione 21-acetate.
12. 4-allenyl-Δ$^5$-androstene-3,17-dione.
13. A member selected from the group consisting of
(a) a 3,17-dihydroxy benzo[d,e]steroid of the formula:

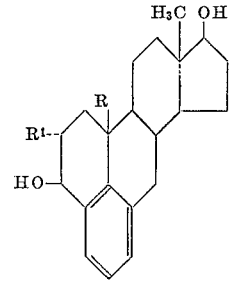

wherein R is selected from the group consisting of hydrogen and methyl and $R^1$ is selected from the group consisting of hydrogen, fluorine and methyl,
(b) a 17-lower acyl ester thereof, and
(c) a 3,17-di-lower acyl ester thereof.
14. 17β-acetoxy benz[d,e]androstan-3β-ol.
15. 3β,17β-diacetoxy benz[d,e]androstane.
16. A benz[d,e]androstane of the formula:

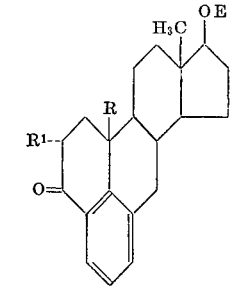

wherein R is selected from the group consisting of hydrogen and methyl; $R^1$ is selected from the group consisting of hydrogen, fluorine and methyl; and E is selected from the group consisting of the following groupings:

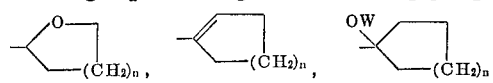

in which n is one of the integers 1 and 2 and W is selected from the group consisting of methyl and ethyl.
17. 17β-(1'-cyclopentenyloxy)benz[d,e]androstan-3-one.
18. 17β-(2'-tetrahydropyranyloxy)benz[d,e]androstan-3-one.

References Cited
UNITED STATES PATENTS 3,300,485   1/1967   Komeno.

HENRY A. FRENCH, *Primary Examiner.*

U.S. Cl. X.R.

260—397.3, 397.4, 397.45, 397.47, 397.5; 167—74

UNITED STATES PATENT OFFICE
CERTIFICATE OF CORRECTION

Patent No. 3,419,550                                        December 31, 196

Alberto Ercoli et al.

It is certified that error appears in the above identified patent and that said Letters Patent are hereby corrected as shown below:

Column 2, lines 45 to 57, column 9, lines 2 to 13, lines 60 to 73, column 10, lines 30 to 44, and column 11, lines 3 to (left-hand structure), and lines 38 to 50, the formula, each occurrence, should appear as shown below:

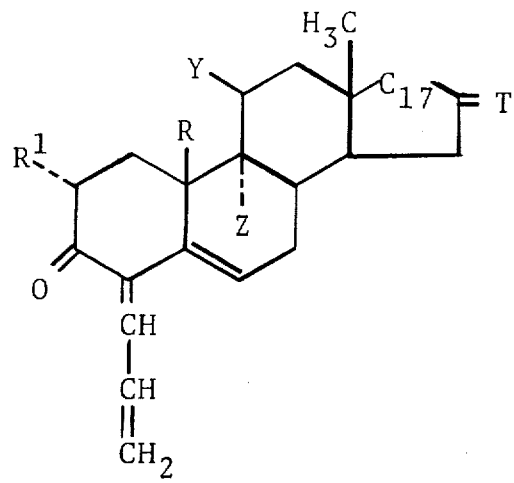

Column 2, lines 45 to 57, column 9, lines 37 to 49, and column 1 lines 3 to 14 (right-hand structure), the formula, each occurrer should appear as shown below:

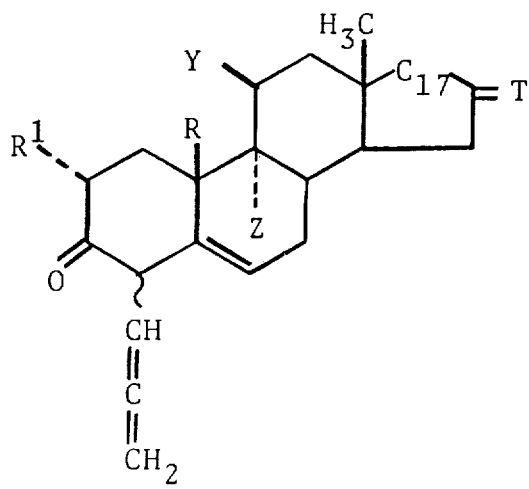

3,419,550

(2)

Column 3, lines 25 to 37, formula IV should appear as shown below

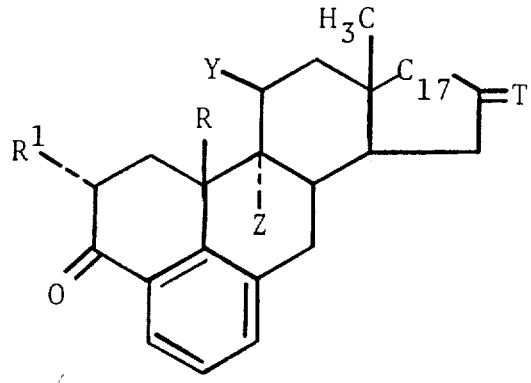

Column 4, lines 11 to 19, formula V should appear as shown below

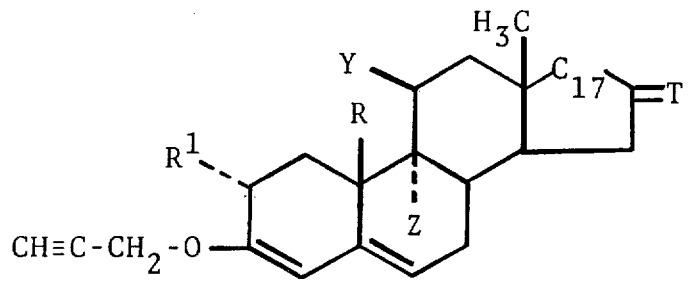

Column 5, line 62, "-4-one" should read -- -3-one --.

Signed and sealed this 11th day of August 1970.

(SEAL)
Attest:

EDWARD M. FLETCHER, JR.
Attesting Officer

WILLIAM E. SCHUYLER, JR.
Commissioner of Patents